(12) United States Patent
Yoo et al.

(10) Patent No.: US 7,412,259 B2
(45) Date of Patent: Aug. 12, 2008

(54) MOBILE PHONE WITH USB INTERFACE

(75) Inventors: Kyung-Min Yoo, Seongnam-si (KR); Doo-Youn Lee, Seongnam-si (KR)

(73) Assignee: Lime Electronics Co., Ltd., Kyungki-do (KR)

( * ) Notice: Subject to any disclaimer, the term of this patent is extended or adjusted under 35 U.S.C. 154(b) by 599 days.

(21) Appl. No.: 11/062,984

(22) Filed: Feb. 22, 2005

(65) Prior Publication Data

US 2006/0089171 A1    Apr. 27, 2006

(30) Foreign Application Priority Data

Feb. 19, 2004    (KR) .................... 10-2004-0011041
Aug. 27, 2004    (KR) .................... 10-2004-0067809
Aug. 27, 2004    (KR) .................... 20-2004-0024575

(51) Int. Cl.
*H04B 1/00*    (2006.01)
*H04M 1/00*    (2006.01)

(52) U.S. Cl. .................... 455/557; 455/575.1; 455/559

(58) Field of Classification Search ................ 455/557, 455/558, 559, 572, 550.1, 556.1, 575.1
See application file for complete search history.

(56) References Cited

U.S. PATENT DOCUMENTS

| | | | |
|---|---|---|---|
| 6,810,274 B2 * | 10/2004 | Sawada et al. | 455/572 |
| 2002/0052219 A1 * | 5/2002 | Hamamura | 455/557 |
| 2004/0157638 A1 * | 8/2004 | Moran et al. | 455/550.1 |

FOREIGN PATENT DOCUMENTS

KR    10-2005-0039491    4/2005

* cited by examiner

*Primary Examiner*—Edward Urban
*Assistant Examiner*—Christian A Hannon
(74) *Attorney, Agent, or Firm*—Marshall, Gerstein & Borun LLP

(57) ABSTRACT

A mobile phone having a USB interface and including a main body and a battery pack removably mounted to the main body is provided. The mobile phone includes a USB connector that may be connected to an external device to allow data transmission between the external device and the mobile phone; a holding unit for containing the USB connector and from which the USB connector may be withdrawn; and a housing mounted in the mobile phone and including a flash memory for storing data, and a controller for controlling a data signal of the flash memory through the USB connector.

23 Claims, 10 Drawing Sheets

MOBILE PHONE WITH USB INTERFACE

BACKGROUND OF THE INVENTION (a) Field of the Invention

The present invention relates to a mobile phone. More particularly, the present invention relates to a mobile phone that is universal serial bus (USB)-based to allow for connection to a personal computer (PC) such that data transmission therebetween may be easily and efficiently performed.

(b) Description of the Related Art

The use of wireless communication devices, and hence the networks forming the communication support infrastructure, has been increasing at a phenomenal rate in recent years. In many parts of the world, the mobile phone has become as indispensable as many of the other products we use on a daily basis.

The main different protocols used in mobile communications include personal communication service (PCS), code division multiple access (CDMA), and global system of mobile communication (GSM). By utilizing a mobile phone, users are able to communicate with other users of mobile phones, as well with those having fixed-line phones. Further, mobile phone users may exchange text messages.

The fierce competition between mobile phone manufacturers has resulted in many companies providing various different functions to their mobile units in an effort to distinguish their phones from their competitors. A memory function is an example of such a function.

The memory function is able to store a plurality of telephone numbers and other personal information, and provide output of the stored information as needed. A flash memory is typically mounted on a circuit board contained in the mobile phone. With this configuration, a central processing unit is able to store or access data in data areas of the flash memory through memory addressing and I/O addressing processes.

However, data storage using the flash memory contained in the mobile phone is limited by the storage capacity of the flash memory. The end result is that not much data may be stored.

Although there are portable hard disks and other similar products, such devices have many drawbacks including limited portability, inconvenience in use, and large size. Even if size is minimized, these devices are designed for use with only specific products. Hence, portable hard disks are not widely used.

Further, present mobile phones and similar information devices are adopting methods to increase high-capacity flash memory in order to handle ever-increasing information capacity demands. However, this increases the costs of these devices.

One area of development involves mounting a storage device such as a hard disk within the mobile phone in an effort to increase storage capacity. For connection to an external device, these mobile phones may be USB-based, in which case a USB cable and connector are used for the connection. However, performing such a connection is inconvenient.

Further, the storage devices mounted in the mobile phone are developed for the sole purpose of data storage such that the connection function with the mobile phone is limited.

In addition, a separate charger and associated connector are needed to charge the battery in the conventional mobile phone.

SUMMARY OF THE INVENTION

The present invention provides a mobile phone that is USB-based to allow the mobile phone to function as an auxiliary storage device.

In an exemplary embodiment of the present invention, there is provided a mobile phone having a USB interface and including a main body and a battery pack removably mounted to the main body. The mobile phone comprises: a USB connector that may be connected to an external device to allow data transmission between the external device and the mobile phone; a holding unit for containing the USB connector and from which the USB connector may be withdrawn; and a housing mounted in the mobile phone and including a flash memory for storing data, and a controller for controlling a data signal of the flash memory through the USB connector.

The holding unit includes an insert groove formed to one side of the mobile phone in spatial communication with the outside of the mobile phone and into which the USB connector may be removably inserted, a movement cavity provided in the mobile phone, a wire electrically coupled to the USB connector and that may be positioned within the movement cavity by passing through a hole formed in an inner area of the insert groove, a movable connector movably mounted in the movement cavity and electrically coupled to the wire, and a contact connector mounted in the movement cavity adjacent to the insert groove, the contact connector being coupled to the controller and selectively coupled to the movable connector when the USB connector is removed from the insert groove and fully withdrawn.

An insert cavity is formed in the mobile phone and in spatial communication with the outside of the mobile phone, the housing being removably mounted in the insert cavity; a connector is mounted in an innermost end of the insert cavity and is electrically coupled to the contact connector; and a connector is mounted to the housing that is electrically coupled to the controller to thereby allow removable mounting of the housing.

The USB connector, the holding unit, and the housing are mounted in the battery pack of the mobile phone.

In another embodiment, the holding unit includes an insert groove formed in an outer surface of the mobile phone and into which the USB connector may be positioned, and a hinge axis mounted in the insert. One end of the USB connector is pivotably connected to the hinge axis such that the USB connector may pivot about the hinge axis to be positioned within and pivoted away from the insert groove.

The mobile phone further comprises a power controller connected to the USB connector such that a power signal applied through the USB connector is stably supplied in an amount of charge current needed in a cell of the battery pack.

The mobile phone further comprises a communication unit including a terminal coupled to an internal mainboard of the mobile phone, and a hub controller coupled between the terminal and the USB connector to allow for data transmission between the mobile phone and the external device, the communication unit allowing for wireless communication between the mobile phone and the external device.

A pc-sync program is installed in the controller to facilitate data transmission between the mobile phone and the external device.

The communication unit is mounted in the battery pack, and includes a connecting terminal coupled to the hub controller and exposed outwardly from the battery pack, and a contact terminal connected to the mainboard and mounted to an outer surface of the main body of the mobile phone, coupling between the connecting terminal and the contact terminal resulting in coupling between the hub controller and the mainboard of the mobile phone.

In another embodiment, the holding unit includes an insert groove formed in the battery pack to allow for positioning of the USB connector therein, a wire connected to the USB connector and having a predetermined degree of rigidity to allow for insertion into the battery pack through a hole formed in the insert groove, a guide pathway defined within the battery pack by walls that extend within the battery pack to thereby guide movement of the wire, a contact member formed to one end of the guide pathway, a stopper member formed to one end of the wire that is inserted into the battery pack and contacting the contact member when the wire is extended from the battery pack, and a line connected to a pin of the USB connector and extending outwardly from an end of the wire for connection to the controller.

The line is provided in the guide pathway in a zigzag configuration to allow for a length sufficient to allow the unhindered extension of the wire from the battery pack.

The line includes a center member having a predetermined degree of elasticity, lines mounted around the center member in a lengthwise direction for transmitting an electrical signal, and an insulating outer sheath covering the center member and the lines.

The center member is made of a shape memory alloy, and the outer sheath is made of a polyvinyl chloride resin.

BRIEF DESCRIPTION OF THE DRAWINGS

The accompanying drawings, which together with the specification, illustrate exemplary embodiments of the present invention, and, together with the description, serve to explain the principles of the present invention.

DETAILED DESCRIPTION

Exemplary embodiments of the present invention will now be described in detail with reference to the accompanying drawings.

Figure 1:
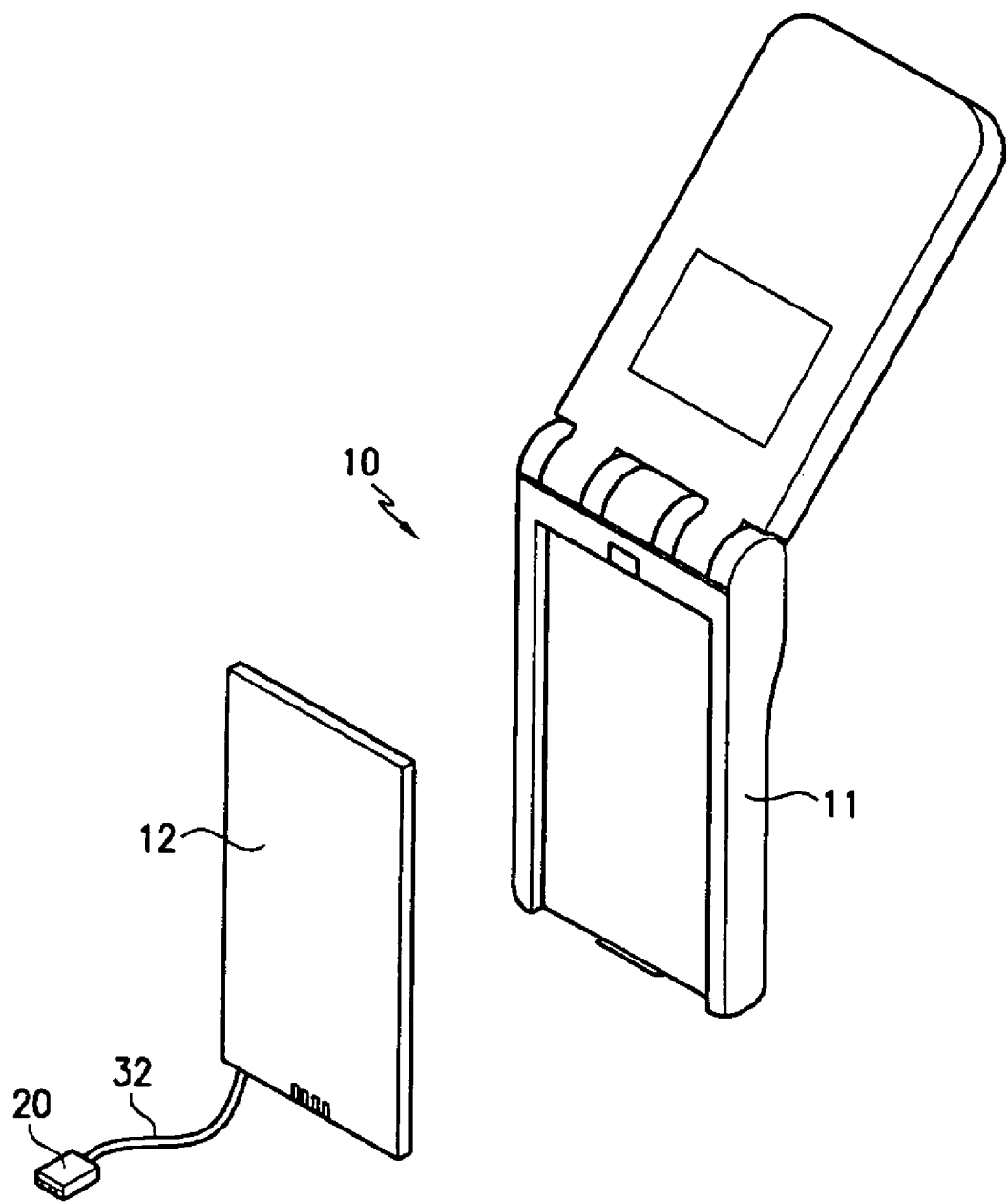
FIG. 1 is a perspective view of mobile phone having a USB interface according to an exemplary embodiment of the present invention.
Figure 2:
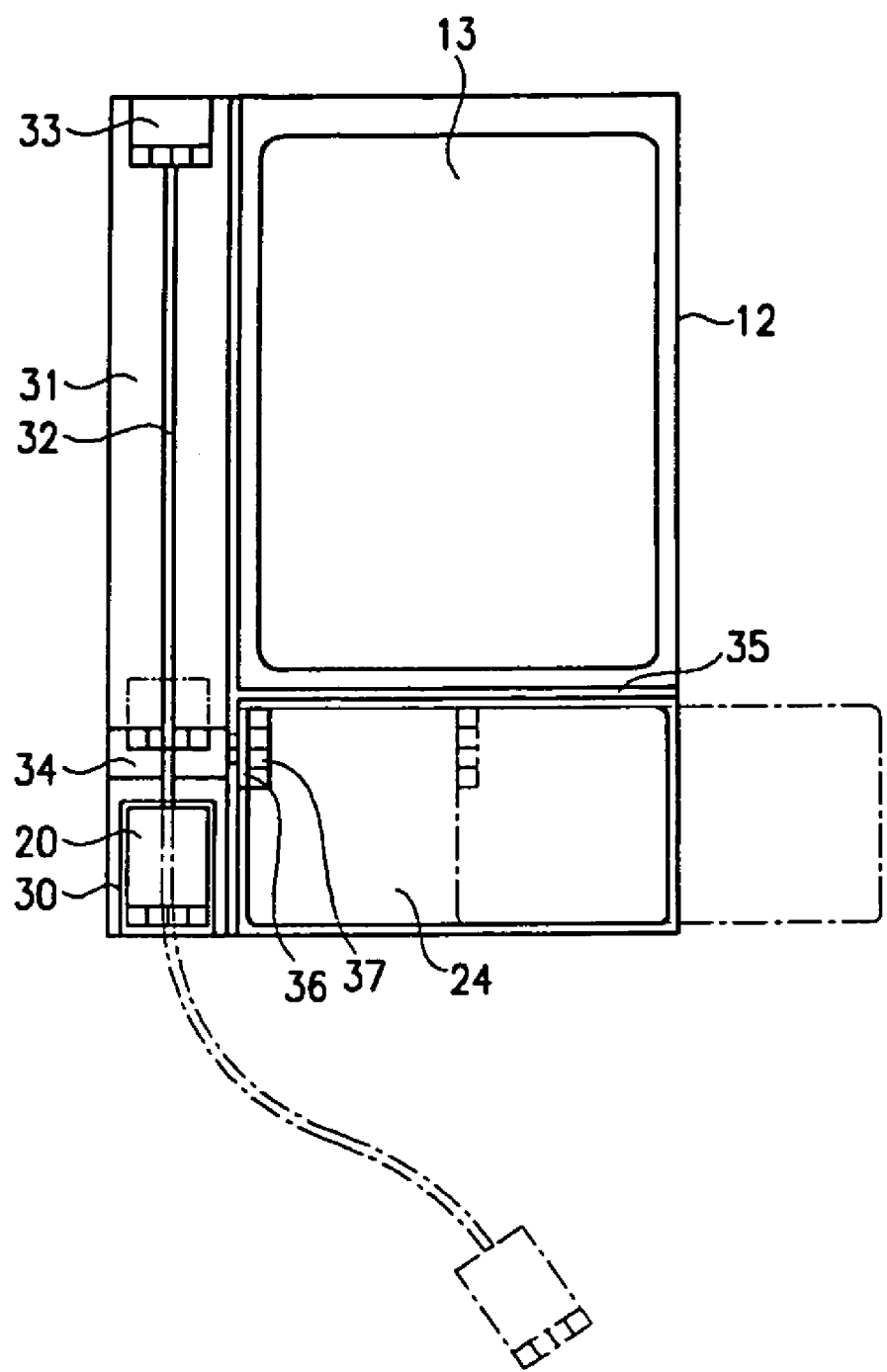
FIG. 2 is a schematic view of a USB connector structure of the mobile phone of FIG. 1.
Figure 3:
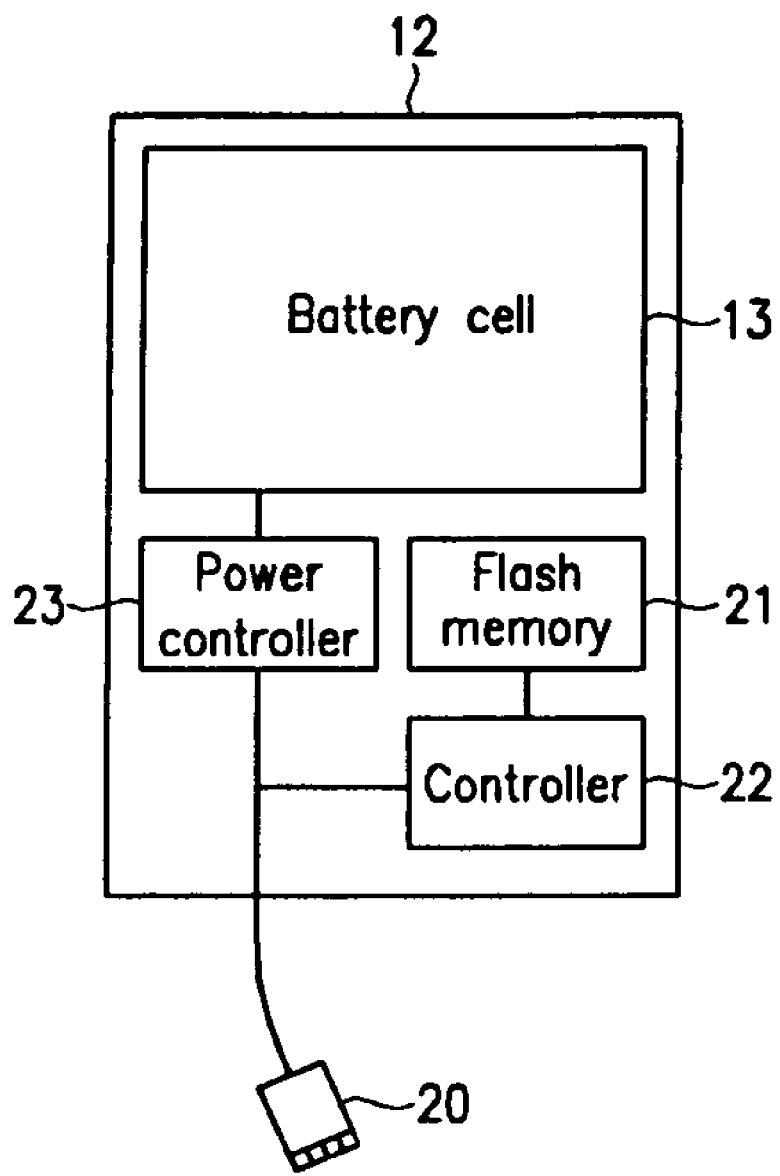
FIG. 3 is a block diagram of a mobile phone according to an exemplary embodiment of the present invention.

FIG. 1 is a perspective view of a mobile phone 10 having a USB interface according to an exemplary embodiment of the present invention, FIG. 2 is a schematic view of a USB connector structure of the mobile phone 10 of FIG. 1, and FIG. 3 is a block diagram of the mobile phone 10 of FIG. 1.

With reference to the drawings, the mobile phone 10 includes a main body 11, an external battery pack 12 that may be removably mounted to a rear surface of the main body 11, a battery cell 13 mounted in the battery pack 12, and a charge circuit element (not shown) mounted in the battery pack 12 and functioning such that power is stably supplied.

In the exemplary embodiment, a USB interface and a storage unit for storing data through the USB interface are included in the battery pack 12. That is, the battery pack 12 includes a USB connector 20 that may be connected to an external device to allow for data input and output, and a holding unit into which the USB connector 20 may be retracted and from which the USB connector 20 may be withdrawn. The storage unit includes a flash memory 21 for storing data, and a controller 22 for controlling data signals of the flash memory 21 through the USB connector 20.

In another exemplary embodiment, the mobile phone further includes a power controller 23 mounted in the battery pack 12. The power controller 23 functions such that a power signal applied through the USB connector 20 is stably supplied in an amount (of charge current) needed in the battery cell 13. In this case, the power controller 23 is also part of the storage unit.

The flash memory 21, the controller 22, and the power controller 23 comprising the storage unit are integrated on a circuit board to be formed as a single unit, and are packaged in a housing 24. The housing 24 is removably mounted in a predetermined area of the battery pack 12. Connection between the housing 24 and the battery pack 12 will be described below.

The housing 24 into which the flash memory 21, the controller 22, and the power controller 23 are packaged is removably mounted to the battery pack 12 as described above. A conventional PCM circuit for battery cell protection is mounted in the battery cell 13 such that when the housing 24 is separated from the battery pack 12, the battery pack 12 may independently supply power to the mobile phone 10. Preferably, the PCM circuit for battery cell protection is separable from the power controller 23 so that it may be mounted to the battery cell 13 in the battery pack 12.

The holding unit is used such that the USB connector 20 may be selectively withdrawn from the battery pack 12. The holding unit is formed to one side of the battery pack 12 and includes an insert groove 30 in spatial communication with the outside of the battery pack 12 and into which the USB connector 20 may be removably inserted, a movement cavity 31 defined by the battery pack 12, a wire 32 electrically coupled to the USB connector 20 and that may be positioned within the movement cavity 31 by passing through the insert groove 30, a movable connector 33 movably mounted in the movement cavity 31 and electrically coupled to the wire 32, and a contact connector 34 mounted in the movement cavity 31 adjacent to the insert groove 30. The contact connector 34 is coupled to the controller 22, and selectively coupled to the movable connector 33, that is, coupled to the movable connector 33 when the USB connector 20 is removed from the insert groove 30 and fully withdrawn.

Preferably, the wire 32 is coated with a flexible material such as rubber so that it may freely bend.

Accordingly, if the USB connector 20 is withdrawn from the insert groove 30 and pulled outwardly, the movable connector 33 is displaced in the movement cavity 31 through its connection to the USB connector 20 by the wire 32. Continued outward extension of the USB connector 20 results in the movable connector 33 being electrically coupled to the contact connector 34. As a result, the USB connector 20 is coupled to the controller 22 via the wire 32, the movable connector 33, and the contact connector 34.

To ensure precise connection between the movable connector 33 and the contact connector 34, it is necessary that the movable connector 33 is prevented from undergoing rotational movement in the movement cavity 31. Therefore, the movement cavity 31 has a polygonal, preferably a square, cross-sectional structure, and the movable connector 33 and the contact connector 34 have a corresponding cross-sectional configuration.

Figure 5:
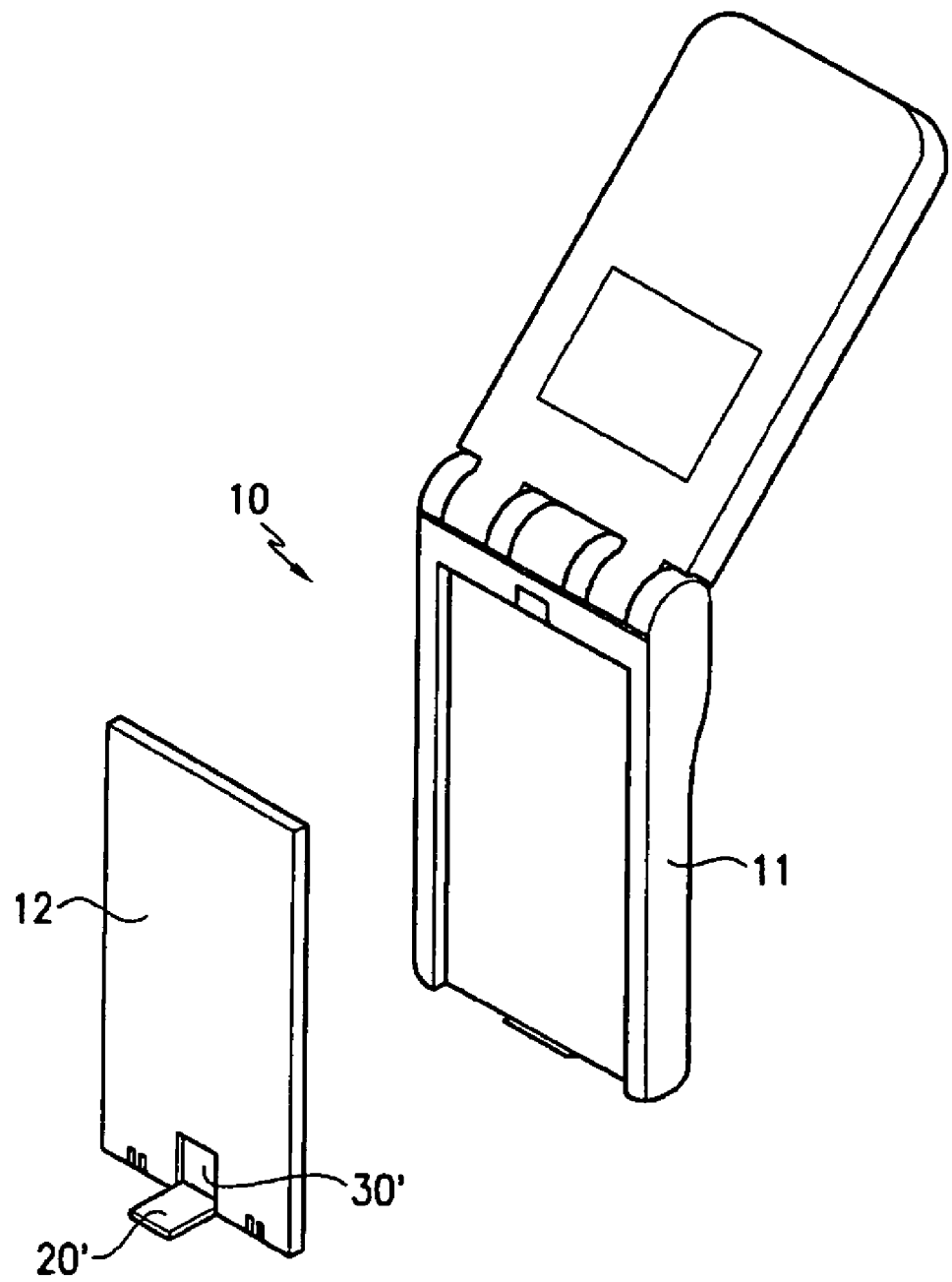
FIG. 5 is a perspective view of a mobile phone according to another exemplary embodiment of the present invention.

In another exemplary embodiment, the holding unit may be formed to a pivotable configuration. In particular, with reference to FIG. 5, an insert groove 30' is formed in an outer surface of a battery pack 12. A USB connector 20' may be positioned in the insert groove 30'. A hinge axis (not shown) is mounted in the insert groove 30', and one end of the USB connector 20' is connected to the hinge axis so that the USB connector 20' may pivot about the hinge axis to be positioned within and pivoted away from the insert groove 30'.

The USB connector 20' is formed such that when seated in the insert groove 30', an outer surface of the USB connector 20' is substantially flush with the outer surface of the battery pack 12. The USB connector 20' is preferably made of the same material as the battery pack 12 so that a uniform and more attractive outer appearance of the battery pack 12 is realized.

Referring back to the original embodiment, the housing 24, which separately packages the storage unit, is removably mounted to the battery pack 12 as described above. To realize this configuration, with reference to FIG. 2, an insert cavity 35 is formed in the battery pack 12 corresponding to a size of the housing 24. The insert cavity 35 is in spatial communication with the outside of the battery pack 12. A connector 36 is mounted in an innermost end of the insert cavity 35, and is electrically coupled to the contact connector 34. Further, a connector 37 is mounted to the housing 24 such that full insertion of the housing 24 into the insert cavity 35 results in electrical coupling between the connector 37 of the housing 24 and the connector 36 of the insert cavity 35.

Accordingly, if the housing 24 is fully inserted into the battery pack 12, the connectors 36, 37 are electrically coupled to one another, as are the controller 22 in the housing 24 and the USB connector 20 in the battery pack 12.

With the above structure, it is necessary only to exchange the housing 24 with another similar device containing the flash memory 21 with a greater storage capacity. That is, it is not necessary to replace the entire battery pack 12 for this purpose.

In another exemplary embodiment, a storage unit and a mobile phone 10 realize a circuit connection such that a flash memory 21 in the storage unit may be used as a memory of the mobile phone 10, and connection of the mobile phone 10 to an external device is realized using a USB connector 20.

Figure 4:
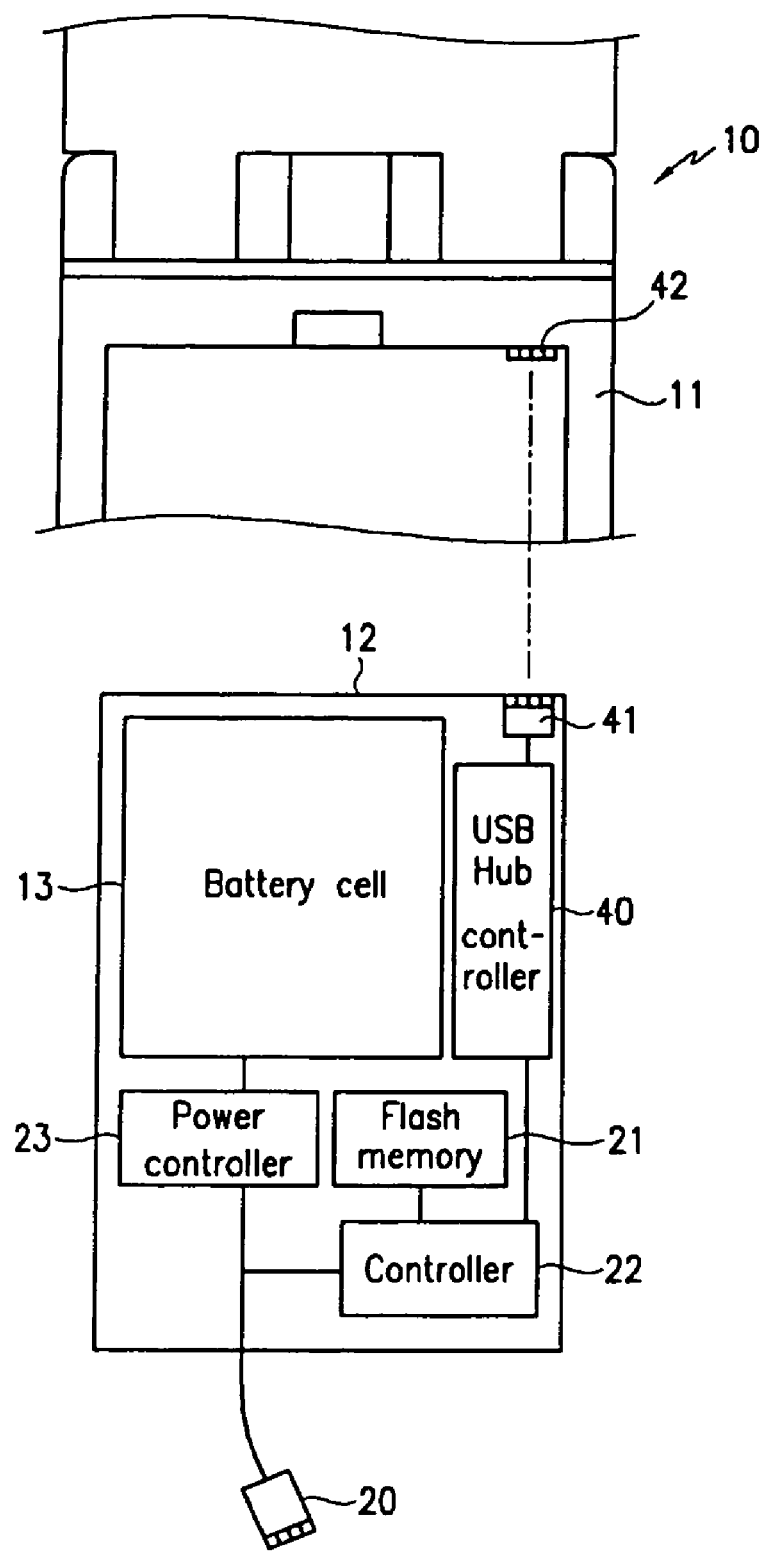
FIG. 4 is a block diagram of a mobile phone having a USB interface according to another exemplary embodiment of the present invention.

Such a configuration may be realized using the configuration shown in FIG. 4.

With reference to FIG. 4, the mobile phone 10 according to this exemplary embodiment includes the USB connector 20 to allow for connection with an external device and the transmission of data between the mobile phone 10 and the external device, a holding unit for receiving the USB connector 20 and allowing the USB connector 20 to be withdrawn therefrom, the flash memory 21 for storing data, a controller 22 for controlling a data signal of the flash memory 21 through the USB connector 20, a power controller 23 for stably supplying a power signal applied through the USB connector 20 in a charge current amount required by a battery cell 13, and a hub controller 40 connected between the USB connector 20 and an internal mainboard (not shown) of the mobile phone 10. The hub controller 40 transmits and receives data through the controller 22 to control the transmission of data between the mobile phone 10 and the external device.

The holding unit is structured as described with reference to FIG. 2, and so a description thereof will not repeated.

The hub controller 40 interconnects the mobile phone 10 and the USB connector 20 such that when the USB connector 20 is connected to a USB port of an external device, i.e., a personal computer, transmission of data at a predetermined rate is made possible through a phone connection network provided by a program contained in the personal computer and according to the functions of the mobile phone 10.

For example, a maximum data transmission rate of 153.6 Kbps is possible in the case where the mobile phone 10 is of the CDMA 1xRTT type, 2 Mbps when of the CDMA 1xEVDO type, and faster transmission rates when other protocols such as IMT-2000 (W-CDMA, TD-SCDMA, etc.) are used. In addition to these CDMA protocols, other protocols may be used (e.g., GSM, GPRS, and PHS) to perform data transmission between the mobile phone 10 and an external device, with the transmission rate being determined by the particular protocol used in the mobile phone 10.

The hub controller 40 is mounted in the battery pack 12. A connecting means is required to allow for connection between the hub controller 40 and the mainboard in the mobile phone 10 as described above. The connecting means includes a connecting terminal 41 coupled to the hub controller 40 and exposed outwardly from the battery pack 12, and a contact terminal 42 connected to the mainboard and mounted to an outer surface of a main body 11 of the mobile phone 10. When the battery pack 12 is mounted to the main body 11, the connecting terminal 41 and the contact terminal 42 are electrically coupled, thereby resulting in coupling between the hub controller 40 and the mainboard of the mobile phone 10.

Further, a storage unit and the mobile phone 10 are coupled to each other in the above structure such that a flash memory 21 of the storage unit may be used as an internal memory of the mobile phone 10. As an example, image data captured through a camera mounted in the mobile phone 10 may be stored in the flash memory 21 of the storage unit, and the image data may be transmitted to an external device such as a computer through the USB connector 20 mounted to the battery pack 12.

Preferably, a pc-sync program is installed in the controller 21 to facilitate data transmission between the mobile phone 10 and an external device when the mobile phone 10 is connected to the external device through the USB connector 20.

In another exemplary embodiment, a USB connector 20 withdrawn from a battery pack 12 is supported by a wire 50 have a predetermined degree of rigidity.

Figure 6:
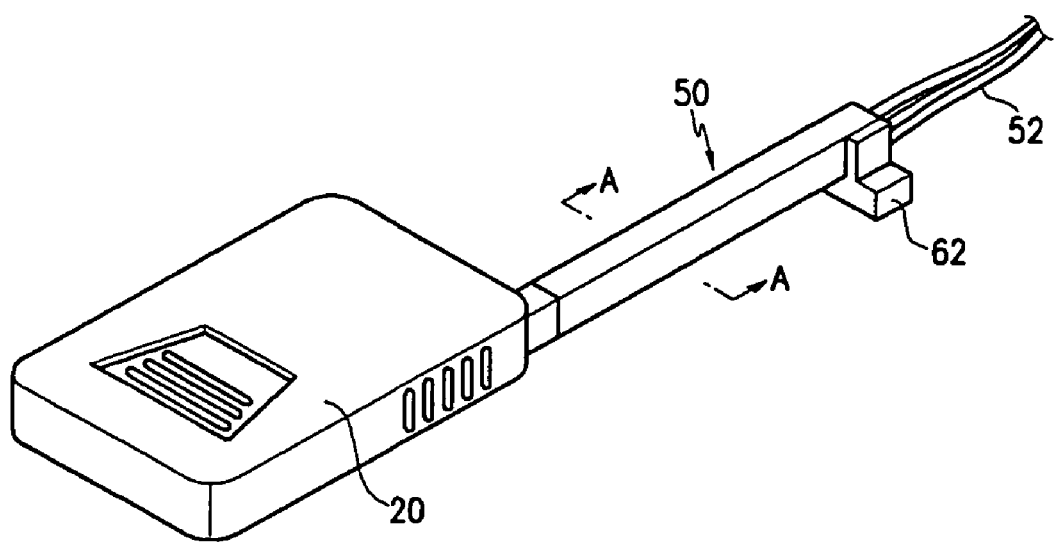
FIG. 6 is a perspective view of a USB connector and a wire according to yet another exemplary embodiment of the present invention.

That is, with reference to FIG. 6, the wire 50 connected to the USB connector 20 is formed in a quadrilateral configuration. A stopper member 62 is mounted to an end of the wire 50 that determines an extension length of the wire 50 from the battery pack 12. This will be described in greater detail below.

Figure 7:
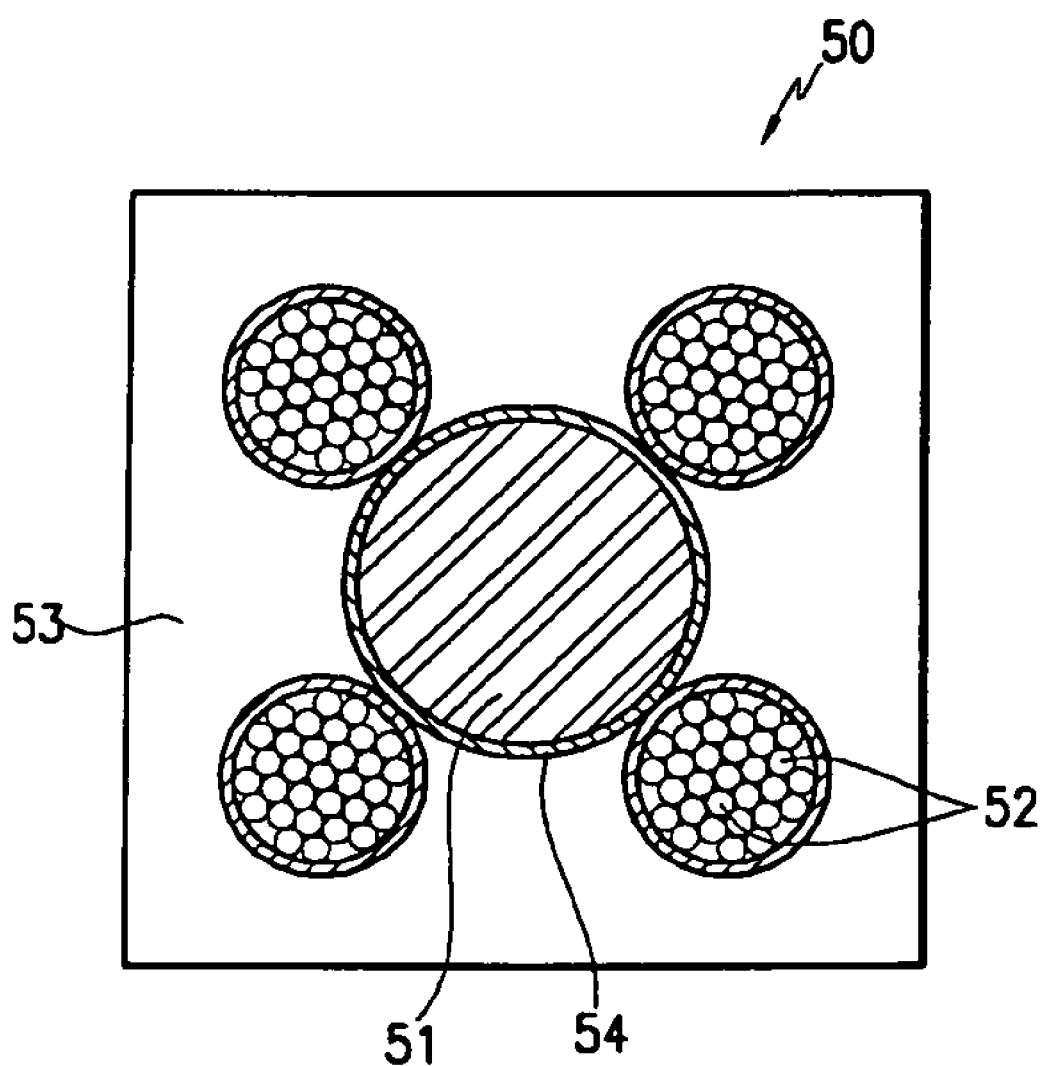
FIG. 7 is a sectional view taken along line A-A of FIG. 6.

With reference to FIG. 7, the wire 50 includes a center member 51 having a predetermined degree of elasticity, lines 52 mounted around the center member 51 while maintaining a predetermined distance from the same, and an outer sheath 53 covering the center member 51 and the lines 52. The lines 52 are connected to pins (not shown) of the USB connector 20.

The center member 51 has a filled circular cross-sectional formation, and is positioned in the center of the wire 50 formed to the quadrilateral shape as described above. Preferably, the center member 51 is made of a shape memory alloy.

However, the present invention is not limited in this respect, and other materials may be used that provide suitable strength and flexibility to the center member 51.

Further, the center member 51 is coated with an insulation layer 54 to ensure full insulation from the lines 52. The insulation material used for the insulation layer 54 may be PVC, glass fiber yarn, PFA, or FEP.

The lines 52 are provided around the circumference of the center member 51 while maintaining the predetermined distance from the same. The lines 52 are provided such that there is no electrical contact therebetween, as well as with the center member 51.

The lines 52 are formed into four groups, each coupled to one of the four pins of the USB connector 20. Among these four groups, a red line 52 is a bus power line (VBUS), a black line 52 is a ground line, and green and white lines are data lines (D+, D−) for transmitting data information.

The outer sheath 53 covers the center member 51 and the lines 52 using a PVC (polyvinyl chloride) resin to thereby protect the center member 51 and the lines.

Further, the outer sheath 53 and an inner surface of the outer sheath 53 are covered by a braided shield (not shown), and a polyester inner shield (not shown). The braided shield and the inner shield are formed in sequence, such that each of the lines 52 running through the wire 50 is protected.

The wire 50 is limited in length as described above, and the lines 52 extend a predetermined length past an end of the outer sheath 53 for electrical coupling to a controller (see 22 in FIG. 9 or 23 in FIG. 4) or a hub controller (see 40 in FIG. 3).

That is, the wire 50 includes a rigid section including the center member 51, the lines 52, and the outer sheath 53 covering these elements, and a flexible section including only the lines 52. When the USB connector 20 is extended from the mobile phone, the rigid section supports the USB connector 20 to thereby allow for easy extension of the USB connector 20.

A holding unit for receiving the USB connector 20, which is associated with the wire 50 structured as described above, will now be described.

Figure 8:
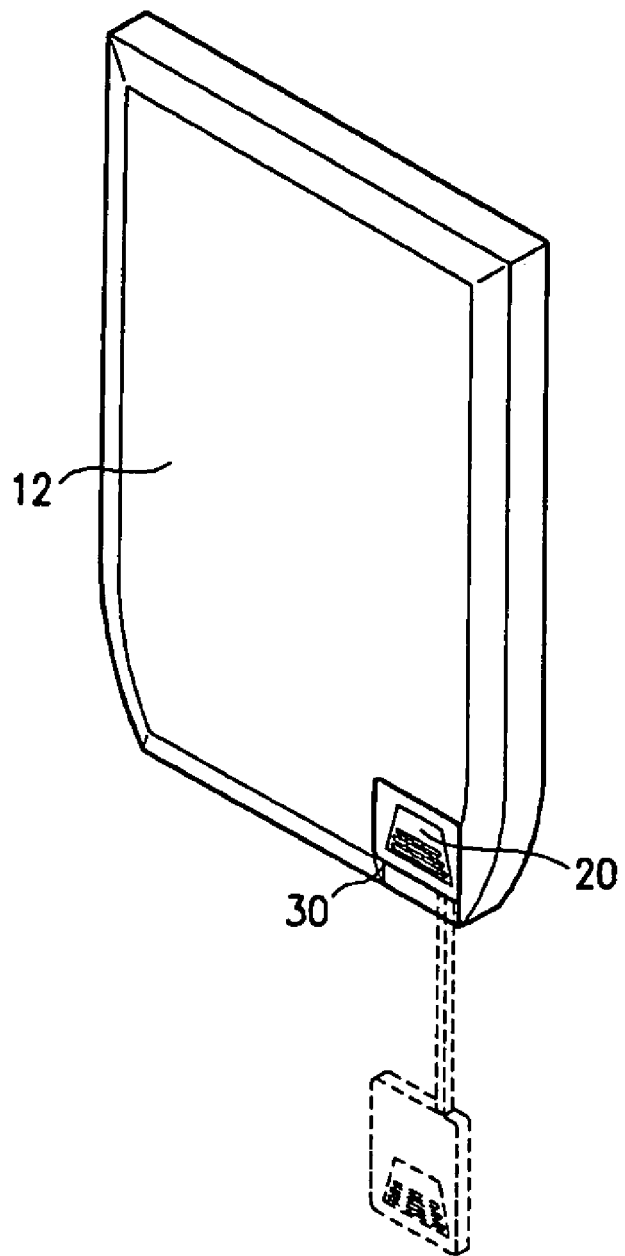
FIG. 8 is a perspective view of the USB connector of FIG. 6 in a state connected to a mobile phone according to yet another exemplary embodiment of the present invention.

With reference to FIG. 8, positioning of the USB connector 20 in a battery pack 12 is shown in this drawing. In this embodiment, an insert groove 30 is formed in a predetermined, peripheral area of the battery pack 12. The USB connector 20 may be positioned filling the insert groove 30 such that an outer surface of the USB connector 20 is exposed, but substantially flush with the remainder of the battery pack 12.

Figure 9:
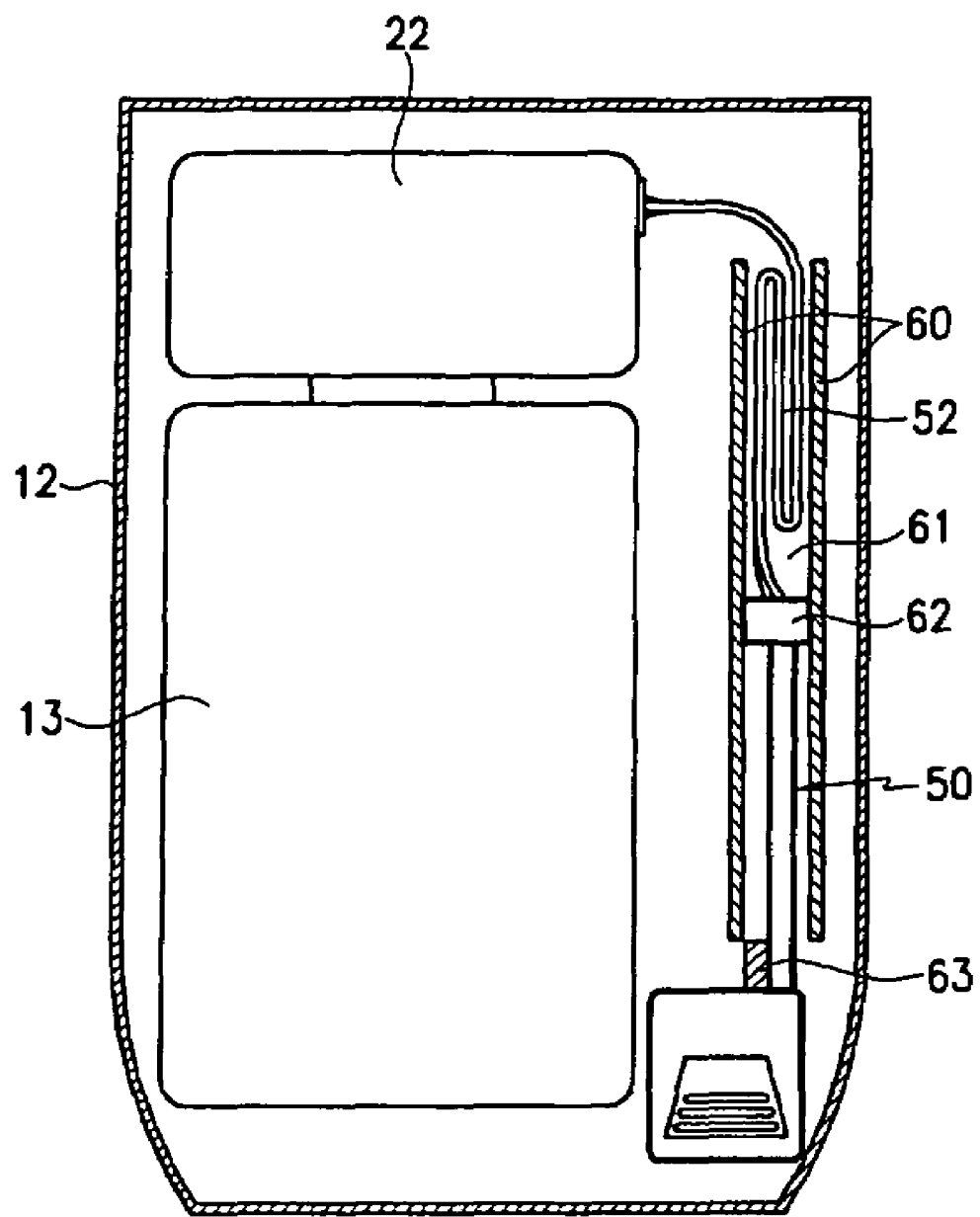
FIGS. 9 and 10 are schematic views showing the USB connector of FIG. 6 retracted in mobile phones according to additional exemplary embodiments of the present invention.
Figure 10:
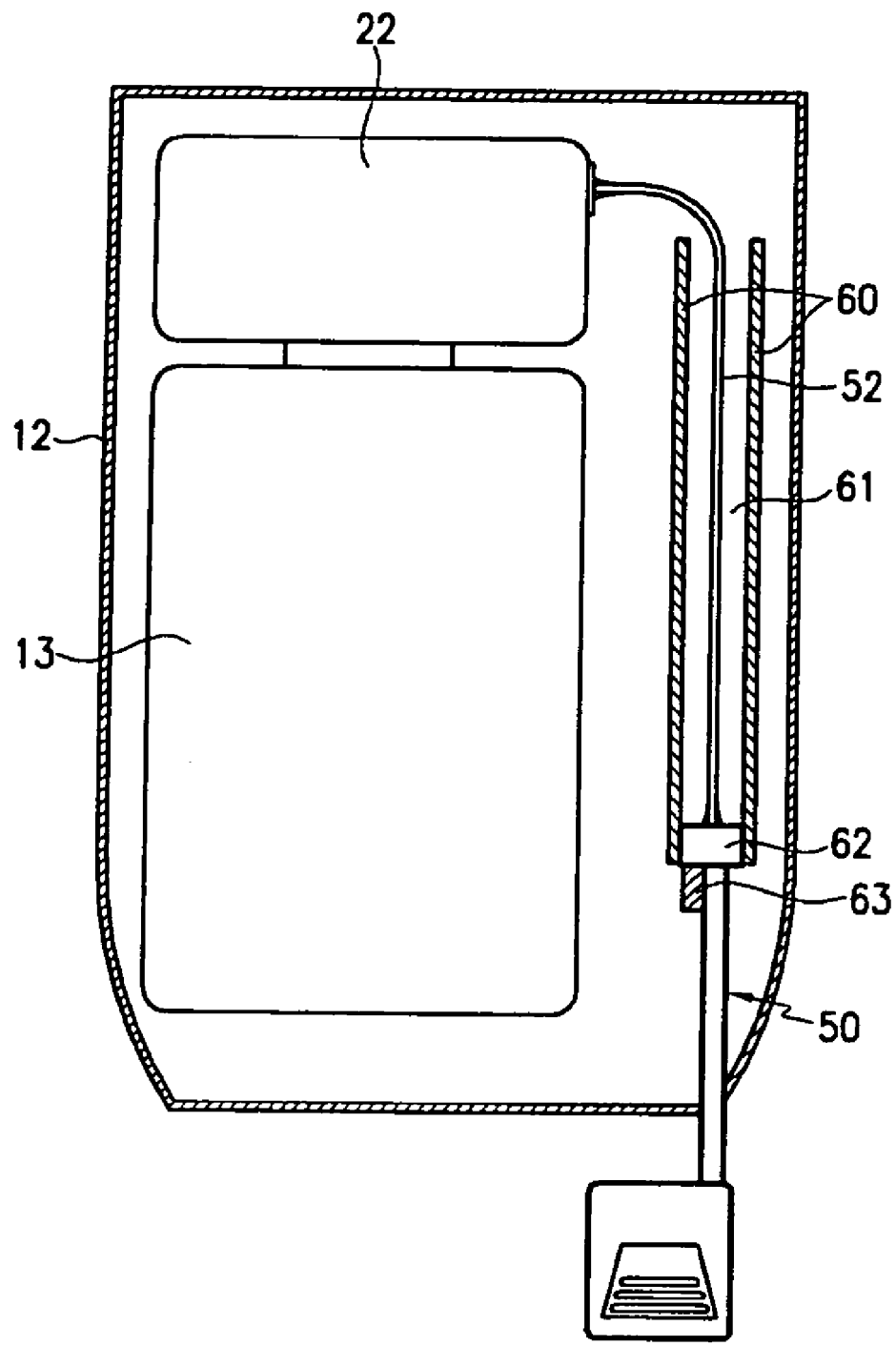

With reference to FIGS. 9 and 10, the holding unit includes a guide pathway 61 defined within the battery pack 12 by walls 60 that extend within the battery pack 12 to the insert groove 30 (see FIG. 8), and a contact member 63 formed to one end of the guide pathway 61 adjacent to the insert groove 30. The stopper member 62 of the wire 50 contacts the contact member 63 when the USB connector 20 is extended from the battery pack 12.

The lines 52 extending from an inner end of the wire 50 are formed to a sufficient length, and provided neatly in a zigzag configuration in the guide pathway 61 when the USB connector 20 is positioned in the insert groove 30. Furthermost ends of the lines 52 extended from the wire 50 are electrically coupled to the controller 22 in the battery pack 12.

The "sufficient length" of the lines 52 refers to a length such that when the USB connector 20 is removed from the insert groove 30 and extended fully such that the stopper member 62 abuts against the contact member 63, the lines 52 do not restrict such movement of the wire 50.

With this configuration, even if the distance from the end of the wire 50 and the controller 22 is increased as a result of the extension of the USB connector 20, the connection between the wire 50 and the controller 22 is maintained, and the lines 52 formed in a zigzag configuration in the guide pathway 61 are unfolded into an approximately straight-line configuration.

The guide pathway 61 may be formed by the walls 60 in both a front plate and a rear plate forming the battery pack 12, and is not limited in this respect. Further, the contact member 63 and the stopper member 62 need only cooperate such that extension of the USB connector 20 is stopped at a suitable point, and the present invention is limited as to the formation and positioning of these elements. That is, various configurations and positioning locations may be utilized as needed and in accordance with the particular design used for the battery pack 12.

If the user removes the USB connector 20 from the insert groove 30 and extends the USB connector 20 outwardly from the battery pack 12, the wire 50 is also extended out of the insert groove 30 through a hole (not shown) formed in the insert groove.

The wire 50 is formed to a quadrilateral shape as described, and moves along the guide pathway 61 in the battery pack 12. As a result, rotational movement of the USB connector 20 is prevented during extension of the same. The rigidity of the wire 50 prevents rotation of the USB connector 20 even following full extension of the USB connector 20.

When the wire 50 is extended through the guide pathway 61 until the stopper member 62 at the end of the wire 50 abuts against the contact member 63 mounted in the guide pathway 61, further movement of the wire 50 is prevented, and the USB connector 20 is in a fully withdrawn state. In such a state, the USB connector 20 may be connected to an external device to perform data transmission.

Further, when desiring to position the USB connector 20 back in the insert groove 30 of the battery pack 12, the user simply applies pressure to the USB connector 20 in the direction toward the insert groove 30 until inserted therein. When the USB connector 20 is pushed toward the insert groove 30, the wire 50 is inserted back into the battery pack 12. The rigidity of the wire 50 ensures that no bending of the same occurs during this operation. The wire 50 passes through the hole in the insert groove 30 and into the guide pathway 61, ultimately resulting in the USB connector 20 being positioned in the insert groove.

The operation of the mobile phone of the present invention will be described in below. The mobile phone having the configuration as shown in FIG. 2 will be used for this description.

First, in order to store data received from a computer in the mobile phone 10, it is unnecessary to use a separate USB cable and connector, and instead, the USB connector 20 mounted in the mobile phone 10 is withdrawn therefrom.

That is, if the USB connector 20 is removed from the insert groove 30 of the battery pack 12 then extended fully outwardly, the USB connector 20 and the wire 32 coupled to the USB connector 20 are extended, and the movable connector 33 connected to the USB connector 20 moves along the movement cavity 31 and is eventually electrically coupled to the contact connector 34. As a result, the controller 22 of the storage unit is coupled to the movable connector 33 such that the USB connector 20 is ultimately electrically coupled to the controller 22 via the wire 32, the movable connector 33, and the contact connector 34.

With the USB connector 20 extended from the mobile phone 10, connection of the USB connector 20 is made to a USB port of a computer, thereby allowing data transmission between the mobile phone 10 and the computer by control by the controller 22.

Further, the hub controller 40 (see FIG. 4) connects the mainboard of the mobile phone 10 to the controller 22 and the USB connector 20, thereby resulting in the storage unit being connected to the mobile phone 10.

That is, the internal mainboard of the mobile phone 10 is electrically coupled to the hub controller 40 via the main body 11 of the mobile phone 10 and the connecting terminal 41 and the contact terminal 42. The hub controller 40 and the terminals 40, 41 form a communication unit, that is, a communication link between the computer and the mainboard through the USB connector 20. Through the connection of the hub controller 40 to the controller 22, transmission of data stored in the flash memory 21 of the storage unit is realized.

Accordingly, the mainboard of the mobile phone 10 transmits images, sound and text data, etc. to the flash memory 21 of the storage unit coupled to the mainboard for storage or for reading of the data stored in the flash memory 21 such that output is performed through an output portion of the mobile phone 10.

Further, the mainboard is connected to an external device through the USB connector 20, and wireless data transmission may be performed through the data transmission function in the mobile phone 10.

When needed, charging of the battery cell 13 of the mobile phone 10 may be performed through the USB connector 20. A power signal, which is one of the signals applied from an external device such as a computer via the USB connector 20, is applied to the power controller 23 separately from the data signal. The power controller 23 sends a current in an amount required during charging of the battery cell 13 to a charge circuit element mounted in the battery pack 12, thereby charging the battery cell 13.

In the mobile phone having a USB interface of the present invention described above, a separate storage means is included in the mobile phone, and using the USB connector mounted in the mobile phone itself, connection to an external device is made possible. As a result, a separate USB cable and connector, or a connector for a carkit connection is not needed. Such a capability provides convenience to the user.

Further, the USB connector mounted in the mobile phone may be used to charge the battery cell of the mobile phone through transmission of power from an external device. Additional convenience is provided to the user as a result.

In addition, the storage capacity of the mobile phone is maximized through the dual data storage functions provided in the battery pack and in the mobile phone itself.

In one embodiment, by providing both rigidity and flexibility to the wire connected to the USB connector, easy connection to an external device and easy extension of the USB connector are possible.

Although embodiments of the present invention have been described in detail hereinabove in connection with certain exemplary embodiments, it should be understood that the invention is not limited to the disclosed exemplary embodiments, but, on the contrary is intended to cover various modifications and/or equivalent arrangements included within the spirit and scope of the present invention, as defined in the appended claims.

What is claimed is:

1. A mobile phone having a USB interface and including a main body and a battery pack removably mounted to the main body, the mobile phone comprising:

a USB connector that may be connected to an external device to allow data transmission between the external device and the mobile phone;

a holding unit for containing the USB connector and from which the USB connector may be withdrawn, wherein the holding unit includes an insert groove formed in the battery pack to allow for positioning of the USB connector therein, a wire connected to the USB connector and having a predetermined degree of rigidity to allow for insertion into the battery pack through a hole formed in the insert groove, a guide pathway defined within the battery pack by walls that extend within the battery pack to thereby guide movement of the wire, a contact member formed to one end of the guide pathway, a stopper member formed to one end of the wire that is inserted into the battery pack and contacting the contact member when the wire is extended from the battery pack, and a line connected to a pin of the USB connector and extending outwardly from an end of the wire for connection to the controller, wherein the line is provided in the guide pathway in a zigzag configuration to allow for a length sufficient to allow the unhindered extension of the wire from the battery pack; and a housing mounted in the mobile phone and including a flash memory for storing data, and a controller for controlling a data signal of the flash memory through the USB connector.

2. The mobile phone of claim 1, wherein the holding unit includes an insert groove formed to one side of the mobile phone in spatial communication with the outside of the mobile phone and into which the USB connector may be removably inserted, a movement cavity provided in the mobile phone, a wire electrically coupled to the USB connector and that may be positioned within the movement cavity by passing through a hole formed in an inner area of the insert groove, a movable connector movably mounted in the movement cavity and electrically coupled to the wire, and a contact connector mounted in the movement cavity adjacent to the insert groove, the contact connector being coupled to the controller and selectively coupled to the movable connector when the USB connector is removed from the insert groove and fully withdrawn.

3. The mobile phone of claim 2, wherein an insert cavity is formed in the mobile phone and in spatial communication with the outside of the mobile phone, the housing being removably mounted in the insert cavity, a connector is mounted in an innermost end of the insert cavity and is electrically coupled to the contact connector, and a connector is mounted to the housing that is electrically coupled to the controller to thereby allow removable mounting of the housing.

4. The mobile phone of claim 1, wherein the USB connector, the holding unit, and the housing are mounted in the battery pack of the mobile phone.

5. The mobile phone of claim 1, wherein the holding unit includes an insert groove formed in an outer surface of the mobile phone and into which the USB connector may be positioned, and a hinge axis mounted in the insert, one end of the USB connector being pivotably connected to the hinge axis such that the USB connector may pivot about the hinge axis to be positioned within and pivoted away from the insert groove.

6. The mobile phone of claim 1, further comprising a power controller connected to the USB connector such that a power signal applied through the USB connector is stably supplied in an amount of charge current needed in a cell of the battery pack.

7. The mobile phone of claim 1, further comprising a communication unit including a terminal coupled to an internal mainboard of the mobile phone, and a hub controller coupled between the terminal and the USB connector to allow for data transmission between the mobile phone and the external device, the communication unit allowing for wireless communication between the mobile phone and the external device.

8. The mobile phone of claim 7, wherein a pc-sync program is installed in the controller to facilitate data transmission between the mobile phone and the external device.

9. The mobile phone of claim 7, wherein the communication unit is mounted in the battery pack, and includes a connecting terminal coupled to the hub controller and exposed outwardly from the battery pack, and a contact terminal connected to the mainboard and mounted to an outer surface of the main body of the mobile phone, coupling between the connecting terminal and the contact terminal resulting in coupling between the hub controller and the mainboard of the mobile phone.

10. The mobile phone of claim 1, wherein the line includes a center member having a predetermined degree of elasticity, lines mounted around the center member in a lengthwise direction for transmitting an electrical signal, and an insulating outer sheath covering the center member and the lines.

11. The mobile phone of claim 10, wherein the center member is made of a shape memory alloy.

12. The mobile phone of claim 10, wherein the outer sheath is made of a polyvinyl chloride resin.

13. A mobile phone having a USB interface and including a main body and a battery pack removably mounted to the main body, the mobile phone comprising:
  a USB connector that may be connected to an external device to allow data transmission between the external device and the mobile phone;
  a holding unit for containing the USB connector and from which the USB connector may be withdrawn, wherein the holding unit includes an insert groove formed in the battery pack to allow for positioning of the USB connector therein, a wire connected to the USB connector and having a predetermined degree of rigidity to allow for insertion into the battery pack through a hole formed in the insert groove, a guide pathway defined within the battery pack by walls that extend within the battery pack to thereby guide movement of the wire, a contact member formed to one end of the guide pathway, a stopper member formed to one end of the wire that is inserted into the battery pack and contacting the contact member when the wire is extended from the battery pack, and a line connected to a pin of the USB connector and extending outwardly from an end of the wire for connection to the controller, wherein the line is provided in the guide pathway in a zigzag configuration to allow for a length sufficient to allow the unhindered extension of the wire from the battery pack; and,
  a power controller mounted in the mobile phone and coupled to the USB connector, the power controller functioning such that a power signal applied through the USB connector is stably supplied in an amount of charge current needed in a cell of the battery pack.

14. The mobile phone of claim 13, further comprising a communication unit including a terminal coupled to an internal mainboard of the mobile phone, and a hub controller coupled between the terminal and the USB connector to allow for data transmission between the mobile phone and the external device, the communication unit allowing for wireless communication between the mobile phone and the external device.

15. The mobile phone of claim 13, wherein the line includes a center member having a predetermined degree of elasticity, lines mounted around the center member in a lengthwise direction for transmitting an electrical signal, and an insulating outer sheath covering the center member and the lines.

16. The mobile phone of claim 15, wherein the center member is made of a shape memory alloy.

17. The mobile phone of claim 15, wherein the outer sheath is made of a polyvinyl chloride resin.

18. A mobile phone having a USB interface and including a main body and a battery pack removably mounted to the main body, the mobile phone comprising:
  a USB connector that may be connected to an external device to allow data transmission between the external device and the mobile phone;
  a holding unit for containing the USB connector and from which the USB connector may be withdrawn, wherein the holding unit includes an insert groove formed in the battery pack to allow for positioning of the USB connector therein, a wire connected to the USB connector and having a predetermined degree of rigidity to allow for insertion into the battery pack through a hole formed in the insert groove, a guide pathway defined within the battery pack by walls that extend within the battery pack to thereby guide movement of the wire, a contact member formed to one end of the guide pathway, a stopper member formed to one end of the wire that is inserted into the battery pack and contacting the contact member when the wire is extended from the battery pack, and a line connected to a pin of the USB connector and extending outwardly from an end of the wire for connection to the controller, wherein the line is provided in the guide pathway in a zigzag configuration to allow for a length sufficient to allow the unhindered extension of the wire from the battery pack; and,
  a communication unit including a terminal coupled to an internal mainboard of the mobile phone, and a hub controller coupled between the terminal and the USB connector to allow for data transmission between the mobile phone and the external device, the communication unit allowing for wireless communication between the mobile phone and the external device.

19. The mobile phone of claim 18, wherein a pc-sync program is installed in the controller to facilitate data transmission between the mobile phone and the external device.

20. The mobile phone of claim 18, wherein the communication unit is mounted in the battery pack, and includes a connecting terminal coupled to the hub controller and exposed outwardly from the battery pack, and a contact terminal connected to the mainboard and mounted to an outer surface of the main body of the mobile phone, coupling between the connecting terminal and the contact terminal resulting in coupling between the hub controller and the mainboard of the mobile phone.

21. The mobile phone of claim 18, wherein the Line includes a center member having a predetermined degree of elasticity, lines mounted around the center member in a lengthwise direction for transmitting an electrical signal, and an insulating outer sheath covering the center member and the lines.

22. The mobile phone of claim 21, wherein the center member is made of a shape memory alloy.

23. The mobile phone of claim 21, wherein the outer sheath is made of a polyvinyl chloride resin.

* * * * *